(12) United States Patent
Boyd et al.

(10) Patent No.: US 8,998,393 B2
(45) Date of Patent: Apr. 7, 2015

(54) INTEGRATED MULTIFUNCTIONAL VALVE DEVICE

(75) Inventors: Patrick V Boyd, Albany, OR (US); David Olsen, Corvallis, OR (US); Milo A Undlin, Corvallis, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/977,211

(22) PCT Filed: Jan. 7, 2011

(86) PCT No.: PCT/US2011/020498
§ 371 (c)(1),
(2), (4) Date: Jun. 28, 2013

(87) PCT Pub. No.: WO2012/094016
PCT Pub. Date: Jul. 12, 2012

(65) Prior Publication Data
US 2013/0271538 A1    Oct. 17, 2013

(51) Int. Cl.
*B41J 2/175* (2006.01)
*F16K 31/16* (2006.01)
*F16K 17/14* (2006.01)
*F16K 7/16* (2006.01)

(52) U.S. Cl.
CPC ............... *F16K 31/16* (2013.01); *F16K 17/14* (2013.01); *B41J 2/17513* (2013.01); *F16K 7/16* (2013.01)

(58) Field of Classification Search
USPC .......................................................... 347/86
See application file for complete search history.

(56) References Cited

U.S. PATENT DOCUMENTS

| 1,641,756 A | 9/1927 | Hass |
| 2,476,310 A | 9/1949 | Langdon |

(Continued)

FOREIGN PATENT DOCUMENTS

| CN | 85203707 | 9/1986 |
| CN | 1535833 | 10/2004 |

(Continued)

OTHER PUBLICATIONS

International Search Report & Written Opinion received in PCT Application No. PCT/US2011/020498, mailed on Sep. 14, 2011, pp. 8.

*Primary Examiner* — Stephen Meier
*Assistant Examiner* — Alexander D Shenderov
(74) *Attorney, Agent, or Firm* — Hewlett-Packard Patent Department

(57) ABSTRACT

An integrated multifunctional valve device includes a surface member having a first port and a second port formed therein, a flexible disk member having a central portion and a surrounding portion, a first seat member extending outward from the surface member and coupled to the surrounding portion of the flexible disk member, a second seat member extending outward from the surface member and surrounded by the first seat member. The central portion is movable between an open port position to establish fluid communication between the respective ports and a close port position to stop the fluid communication between the respective ports. The second seat member is configured to selectively receive the central portion of the flexible disk member corresponding to the close port position. The integrated multifunctional valve device also includes an actuator member configured to selectively move the central portion of the flexible disk member into the open port position and the close port position.

20 Claims, 9 Drawing Sheets

(56) References Cited

U.S. PATENT DOCUMENTS

| | | | |
|---|---|---|---|
| 2,707,969 A | | 5/1955 | Landon |
| 3,515,169 A | | 6/1970 | Stanley et al. |
| 4,450,375 A | * | 5/1984 | Siegal .................... 310/331 |
| 4,771,204 A | | 9/1988 | Siegal |
| 5,737,001 A | | 4/1998 | Taylor |
| 5,912,689 A | | 6/1999 | Otsuka et al. |
| 6,145,974 A | | 11/2000 | Shinada et al. |
| 6,203,148 B1 | | 3/2001 | Kishida |
| 6,296,354 B1 | | 10/2001 | Hashimoto |
| 6,390,611 B1 | * | 5/2002 | Kobayashi et al. ............. 347/84 |
| 6,533,403 B2 | | 3/2003 | Hou et al. |
| 6,698,870 B2 | | 3/2004 | Gunther |
| 6,773,097 B2 | | 8/2004 | Dowell |
| 7,445,323 B2 | | 11/2008 | Anderson et al. |
| 7,556,365 B2 | | 7/2009 | Stathem |
| 7,559,634 B2 | | 7/2009 | Miyazawa |
| 7,618,135 B2 | | 11/2009 | Stathem et al. |
| 7,744,832 B2 | | 6/2010 | Horacek et al. |
| 2002/0109760 A1 | | 8/2002 | Miyazawa et al. |
| 2003/0122907 A1 | | 7/2003 | Kim |
| 2003/0128257 A1 | | 7/2003 | Qingguo et al. |
| 2004/0017444 A1 | | 1/2004 | Gunther |
| 2008/0266370 A1 | | 10/2008 | Haines et al. |
| 2009/0096849 A1 | | 4/2009 | Kanbe et al. |
| 2009/0108222 A1 | | 4/2009 | Spiers et al. |
| 2009/0109267 A1 | | 4/2009 | Lee et al. |

FOREIGN PATENT DOCUMENTS

| | | |
|---|---|---|
| CN | 1572512 | 2/2005 |
| CN | 1621237 | 6/2005 |
| CN | 101073044 | 11/2007 |
| CN | 101668637 | 3/2010 |
| EP | 0109239 | 5/1984 |
| EP | 1287999 A2 | 3/2003 |
| EP | 1327524 A1 | 7/2003 |
| EP | 1287999 A3 | 10/2003 |
| EP | 1384588 A1 | 1/2004 |
| EP | 1464502 A1 | 10/2004 |
| GB | 1206556 | 9/1970 |
| JP | 2004-58675 A | 2/2004 |
| TW | 533135 | 5/2003 |
| WO | WO-2005075205 A1 | 8/2005 |
| WO | WO-2009049347 A1 | 4/2009 |

* cited by examiner

INTEGRATED MULTIFUNCTIONAL VALVE DEVICE

BACKGROUND

Valves are used to direct the flow of fluid. In fluid containers such as inkjet cartridges, valves are used to direct the flow of ink and air within the cartridge as needed. Thus, valves assist in the proper function of systems in which the valves are used.

BRIEF DESCRIPTION OF THE DRAWINGS

Non-limiting examples of the present disclosure are described in the following description, read with reference to the figures attached hereto and do not limit the scope of the claims. In the figures, identical and similar structures, elements or parts thereof that appear in more than one figure are generally labeled with the same or similar references in the figures in which they appear. Dimensions of components and features illustrated in the figures are chosen primarily for convenience and clarity of presentation and are not necessarily to scale. Referring to the attached figures:

Throughout the drawings, identical reference numbers designate similar, but not necessarily identical, elements.

DETAILED DESCRIPTION

In the following detailed description, reference is made to the accompanying drawings which form a part hereof, and in which is illustrated by way of illustration specific examples in which the present disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims.

Valves are used to direct the flow of fluid in order to assist in the proper function of the systems in which the valves are used. Valves exist in many forms such as check valves, relief valves, multiport valves, ball valves, and the like. Usage of numerous valves to provide the necessary functions of a respective system can take up valuable space. Also, numerous valves add a layer of complexity to the design and/or cost of the system. In fluid containers, valves may be used to direct the fluid and/or air. Proper placement of numerous valves within the fluid container may require design tradeoffs thereto.

Fluid containers such as removable ink cartridges to be installed in image forming apparatuses, for example, generally require a particular shape to conform to a fluid container receiver of the respective image forming apparatus.

Thus, ink cartridges requiring particular housing shapes potentially further limit the available space for proper placement of valves.

In examples of the present disclosure, an integrated multifunctional valve device is disclosed. For example, the integrated multifunctional valve device may include a regulator valve, a first pressure-actuated valve, a second pressure-actuated valve and a capillary relief valve. Multiple valve functions sharing one or more components thereof are integrated into one device. In examples, one or more of such valves may be check valves.

Thus, the integrated multifunctional valve device can be placed in a single location and still perform a variety of necessary valve functions. Consequently, the integrated multifunctional valve device may result in efficient use of space and reduce valve placement constraints. Further, the arrangement of the respective elements of the integrated multifunctional valve device may enable the valve functions to perform in an efficient manner and provide durability thereto.

Figure 1:
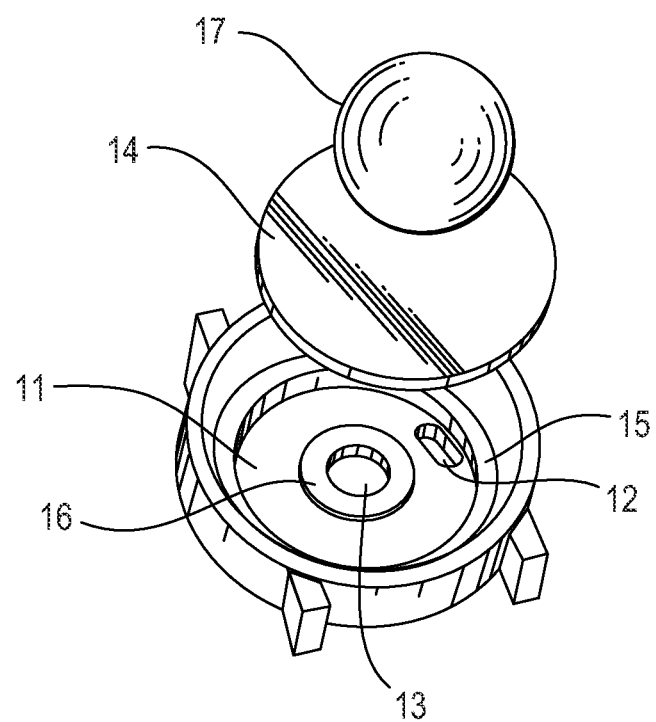
FIG. 1 is a perspective view illustrating an integrated multifunctional valve device in a disassembled form according to an example.
Figure 2A:
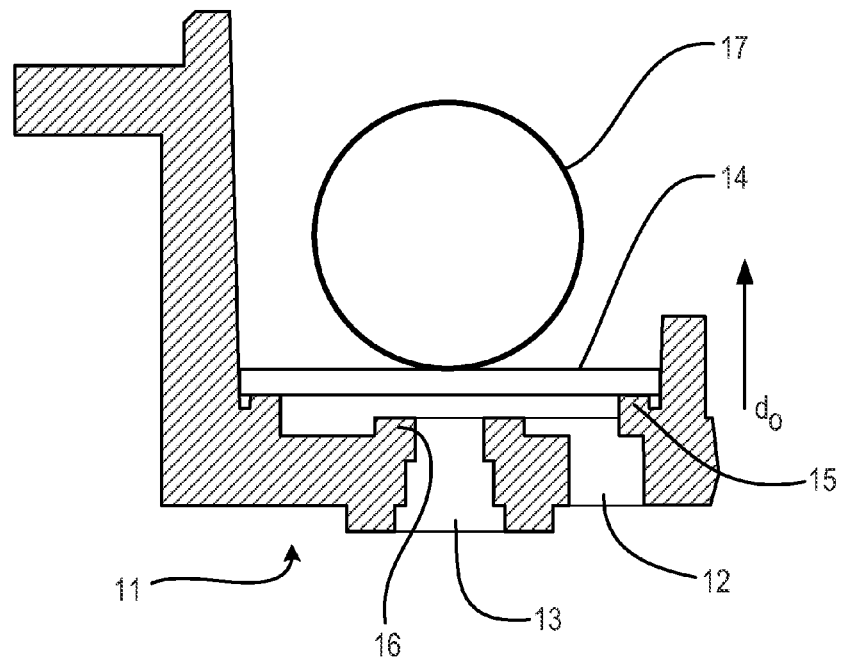
FIGS. 2A and 2B are cross-sectional views illustrating the integrated multifunctional valve device of FIG. 1 in an assembled form according to examples.
Figure 2B:
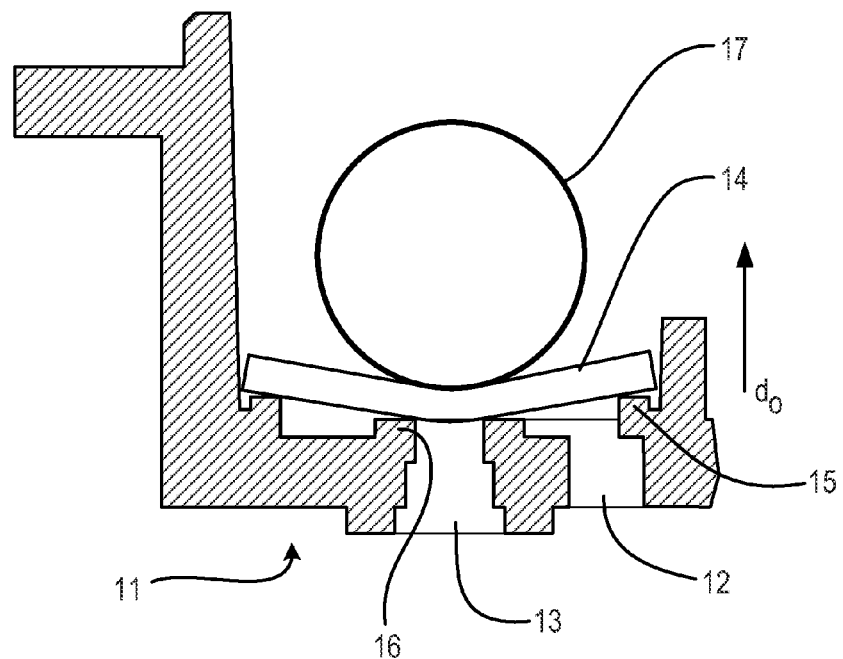

FIG. 1 is a perspective view illustrating an integrated multifunctional valve device in a disassembled form according to an example. FIGS. 2A and 2B are cross-sectional view illustrating the integrated multifunctional valve device of FIG. 1 in an assembled form according to examples. FIG. 2A illustrates the flexible disk member 14 in an open port position. FIG. 2B illustrates the flexible disk member 14 in a close port position.

An integrated multifunctional valve device 10 may be usable with a fluid container 80 (FIG. 8), for example, to direct fluid to, from and/or within the fluid container 80. Referring to FIGS. 1, 2A and 2B, in the present example, the integrated multifunctional valve device 10 may include a surface member 11 having a first port 12 and a second port 13 formed therein, a flexible disk member 14, a first seat member 15 extending outward from the surface member 11, a second seat member 16 extending outward from the surface member 11 and an actuator member 17. In the present example, the surface member 11 may be a portion of the fluid container 80 such as a housing portion and/or wall portion thereof. In other examples, the surface member 11 may be separate and attachable to the fluid container 80.

Figure 3:
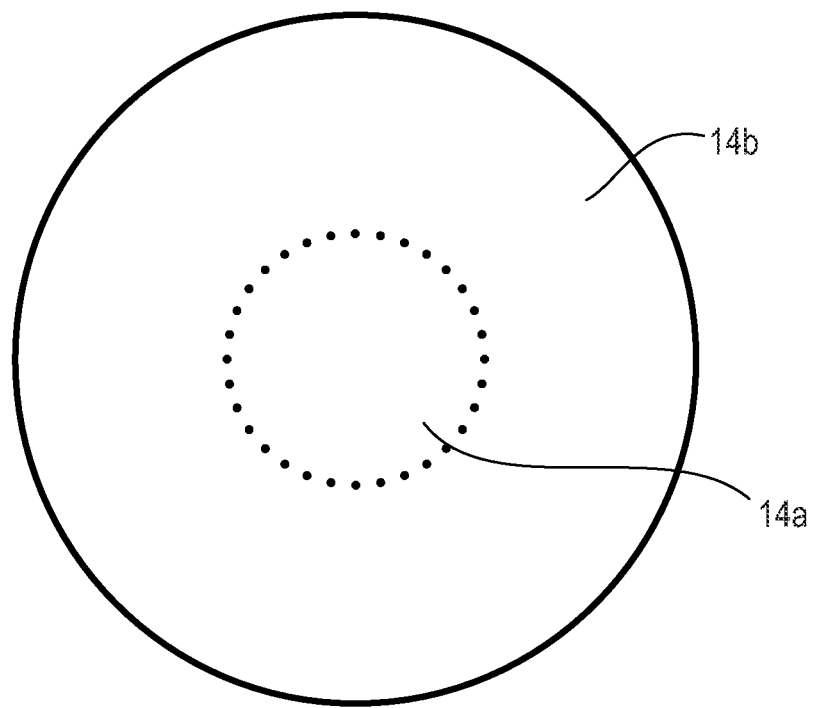
FIG. 3 is a top view illustrating a flexible disk member of the integrated multifunctional valve device of FIGS. 1 and 2 according to an example.

FIG. 3 is a top view illustrating a flexible disk member of the integrated multifunctional valve device of FIG. 1 according to an example. Referring to FIGS. 2A-3, in the present example, the flexible disk member 14 includes a central portion 14a and a surrounding portion 14b. The surrounding portion 14b, for example, may surround at least a portion of the central portion 14a. The central portion 14a of the flexible disk member 14 is movable between an open port position (FIG. 2A) to establish fluid communication and a close port position (FIG. 2B) to stop the fluid communication between the respective ports 12 and 13. The surrounding portion 14b of the flexible disk member 14 may be coupled to the first seat member 15. For example, the surrounding portion 14b of the flexible disk member 14 may be urged against the first seat member 15. In other examples, the surrounding portion 14b of the flexible disk member 14 may be fastened to the first seat member 15 through adhesives, or the like. In examples, the flexible disk member 14 may be resilient, circular in shape, and be made of an elastomeric material such as ethylene polypropylene diene monomer (EPDM). In other examples, the flexible disk member 14 may be made of materials other than EPDM and formed in non-circular shapes.

Referring to FIGS. 1-3, the second seat member 16 is surrounded by the first seat member 15. In an example, the first and second seat members 15 and 16 are in a form of concentric rings. In the present example, the respective rings are in the shape of a circle. The first seat member 15 is an outer ring. The second seat member 16 is an inner ring. The first seat member 15 extends in an outward direction $d_o$ from the surface member 11 past the second seat member 16. The outward direction $d_o$, for example, is a direction substantially perpendicular to and away from a surface portion of the surface member 11 in which the respective ports 12 and 13 are formed. The second seat member 16 is configured to selectively receive the central portion 14a of the flexible disk member 14 corresponding to the close port position as illustrated in FIG. 2B.

Figure 4:
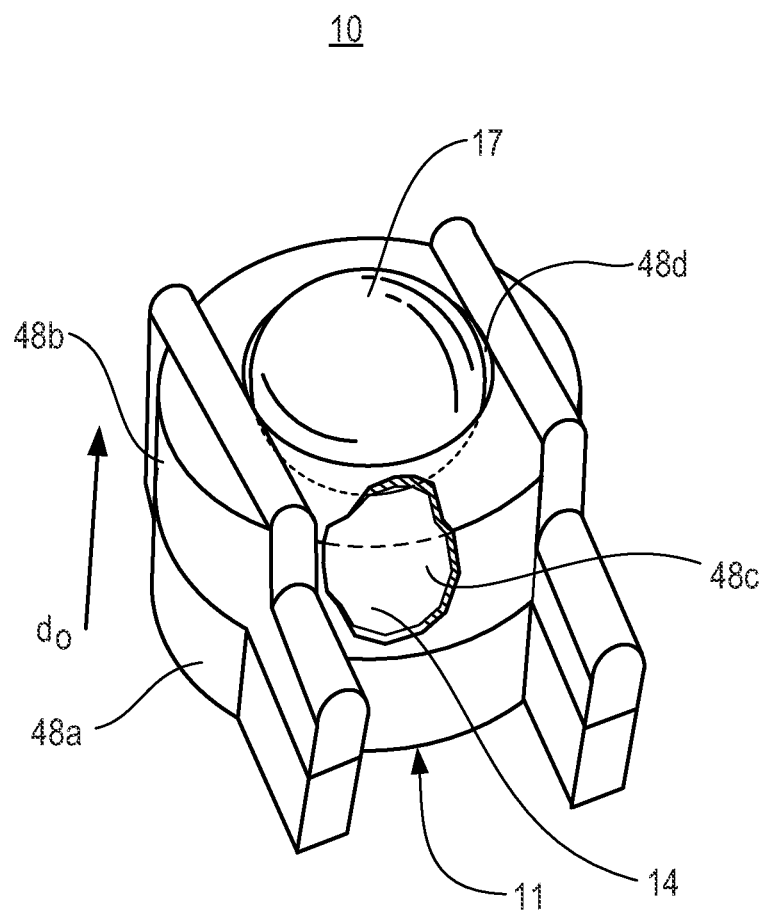
FIG. 4 is a perspective view illustrating the respective housing members of an integrated multifunctional valve device according to an example.
Figure 5A:
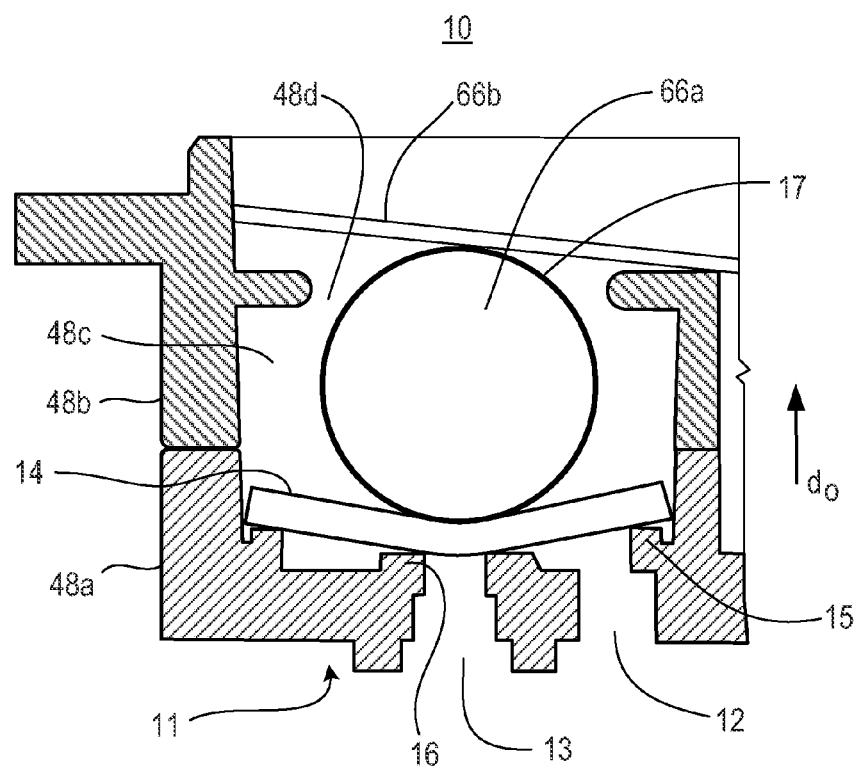
FIGS. 5A and 5B are cross-sectional views illustrating the housing members of the integrated multifunctional valve device of FIG. 4 and a lever member according to examples.
Figure 5B:
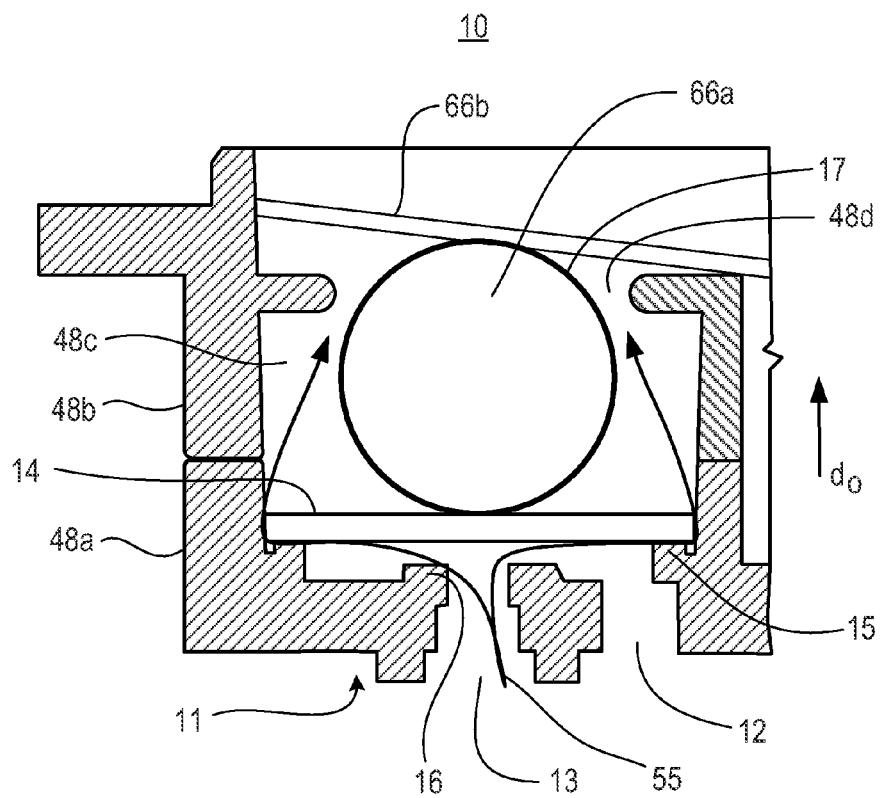

FIG. 4 is a perspective view illustrating the respective housing members of an integrated multifunctional valve device 10 according to an example. FIGS. 5A and 5B are cross-sectional views illustrating the housing members of the integrated multifunctional valve device of FIG. 4 and a lever member according to examples. FIG. 5A illustrates the flexible disk member 14 in a close port position. FIG. 5B illustrates the flexible disk member 14 in an open port position. Referring to FIGS. 4-5B, in an example, the fluid container 80 (FIG. 8) may include a first housing member 48a, a second housing member 48b, and a capillary path 55. The first housing member 48a and the second housing member 48b form an enclosed chamber 48c therebetween.

The first housing member 48a may extend in an outward direction $d_o$ from the surface member 11 and to surround the first port 12, the second port 13, the first seat member 15, the second seat member 16 and the flexible disk member 14. In an example, the first housing member 48a and the surface member 11 may be a unitary member. In other examples, the first housing member 48a may be formed separately, disposed opposite and/or coupled to the surface member 11, for example, through positioning components (not illustrated), adhesives, friction-fit arrangement, or the like. In an example, the second housing member 48b may be permanently or removably coupled to the first housing member 48a. The second housing member 48b includes an access opening 48d to provide access to inside and outside of the enclosed chamber 48c.

Referring to FIGS. 4-5B, in the present example, the actuator member 17 is configured to selectively move the central portion 14a of the flexible disk member 14 into the close port position (FIG. 5A) and the open port position (FIG. 5B). The central portion 14a of the flexible disk member 14 is moved into contact with and extends across the second seat member 16 to cover the second port 13 in the close port position as illustrated in FIG. 5A. Alternatively, the central portion 14a of the flexible disk member 14 is moved out of contact with the second seat member 16 to uncover the second port 13 in the open port position as illustrated in FIG. 5B. Referring to FIGS. 5A and 5B, the actuator member 17 (FIG. 4) may include an actuator ball 66a and a lever member 66b movable between a plurality of positions. The lever member 66b is configured to move the actuator ball 66a toward and away from the second seat member 16 based at least on the respective position of the lever member 66b. For example, the actuator ball 66a and flexible disk member 14 may be movably disposed in the enclosed chamber 48c.

Figure 6A:
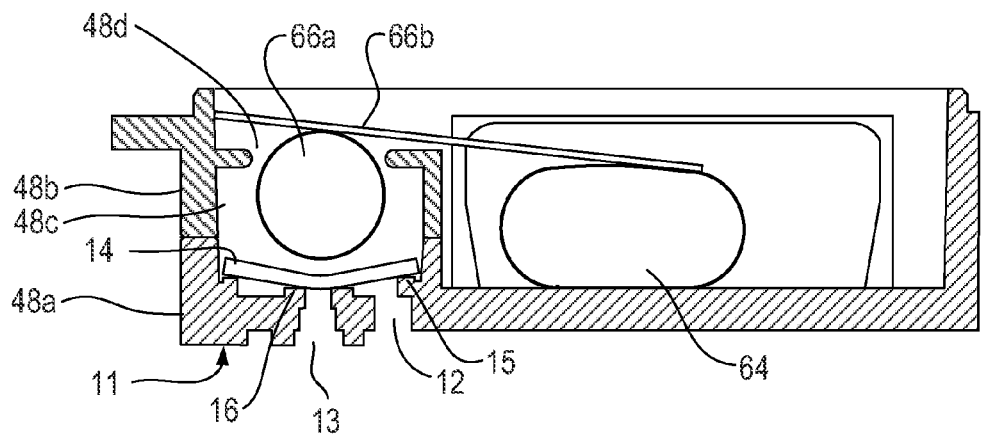
FIGS. 6A-6C are side views illustrating a portion of a fluid container according to examples.
Figure 6B:
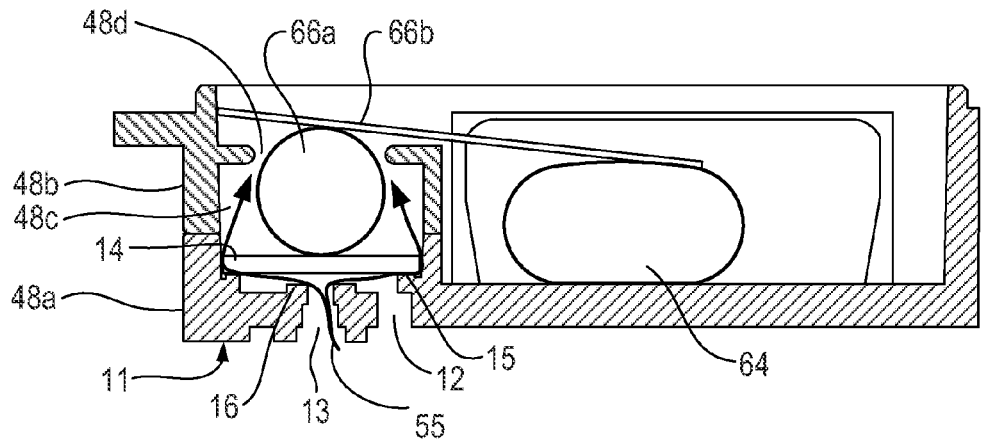
Figure 6C:
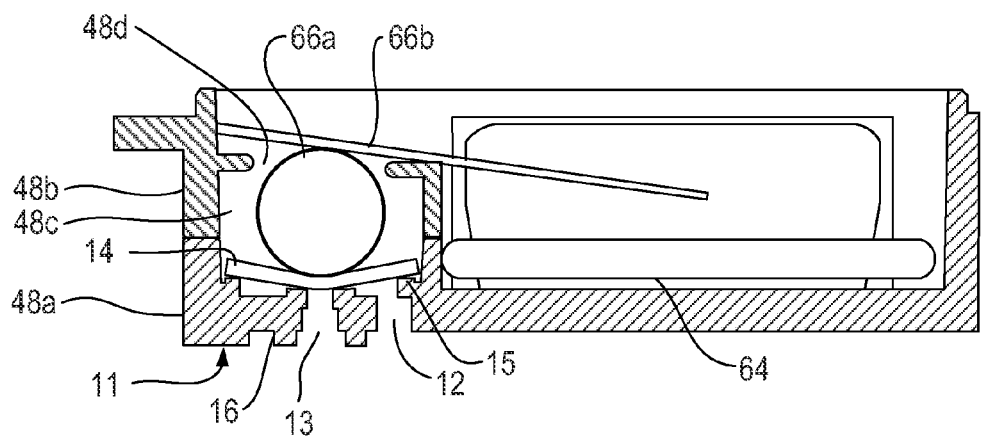

FIGS. 6A-6C are side views illustrating a portion of a fluid container according to examples. Referring to FIGS. 6A-6C, the lever member 66b may be disposed outside of the enclosed chamber 48c. One end of the lever member 66b may be coupled to the first housing member 48a, the second housing member 48b, other components of the integrated multifunctional valve device 10, or other devices. Another end of the lever member 66b may move, for example, about the coupled end to allow the lever member 66b to access the actuator ball 66a in the enclosed chamber 48c through the access opening 48d of the second housing member 48b. For example, a portion of the actuator ball 66a may be within the enclosed chamber 48c and another portion of the actuator ball 66a may protrude outside of the enclosed chamber 48c through the access opening 48d. In examples, the actuator member 17 (FIG. 4) may be a unitary member such as a lever having a circumferential engagement portion (not illustrated) to selectively engage the central portion 14a of the flexible disk member 14, or the like (not illustrated).

Referring to FIGS. 6A-6C, in an example, the lever member 66b is placed in the respective plurality of positions based on an expansion state of a regulator unit 64. For example, the regulator unit 64 may include one or more of a pump, a biasing mechanism, a spring, a variable-volume chamber, and an expansion and contraction member, or the like. The lever member 66b may come in contact with an inflatable bag and move a respective distance corresponding to an amount in which the inflatable bag is inflated (e.g., expansion state). In an example, the inflatable bag may be inflated and deflated through a pump, or the like (not illustrated). Consequently, movement of the lever member 66b causes the lever member 66b to move the actuator ball 66a which, in turn, moves the flexible disk member 14.

Accordingly, in an example, the flexible disk member 14 is configured to move into the close port position (FIGS. 6A and 6C) based on the respective position of the lever member 66b. In other examples, the flexible disk member 14 is configured to move into the close port position based on the respective position of the lever member 66b and a state of the fluid container 80 and/or portion thereof. For example, the states of the fluid container 80 may include a hyperinflation priming and/or purging state (FIG. 6A), a backpressure regulation state (FIG. 6B), and a normal and/or altitude robust state (FIG. 6C). The hyperinflation priming and/or purging state may include, for example, an inflatable bag expanded to a respective expansion state to prime and/or purge one or more chambers within or external to the fluid container 80. The backpressure regulation state may include, for example, a backpressure-induced expansion of the inflatable bag to a respective expansion state to limit unwanted fluid leaks from the fluid container 80 and allow fluid application such as printing, or the like, therefrom. In the backpressure regulation state, a capillary path 55 may be established, for example, for air to flow between the first seat member 15 and the flexible disk member 14. The normal and/or altitude robust state may include, for example, the inflatable bag partially-expanded to a respective expansion state to compensate for altitude changes, for example, during shipping, transporting, or the like, of the fluid container 80.

Figure 7A:
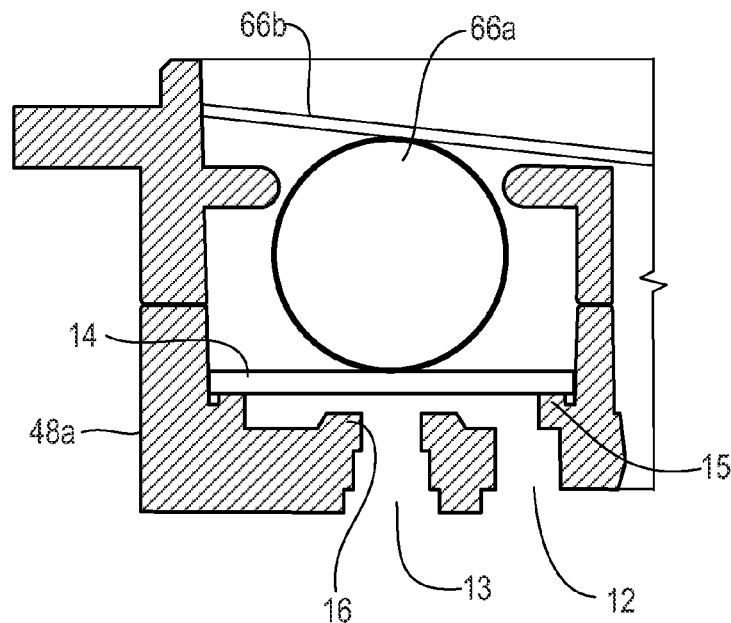
FIGS. 7A-7D are representational views of respective valve functions of the integrated multifunctional valve device of FIGS. 1-2 according to examples.
Figure 7B:
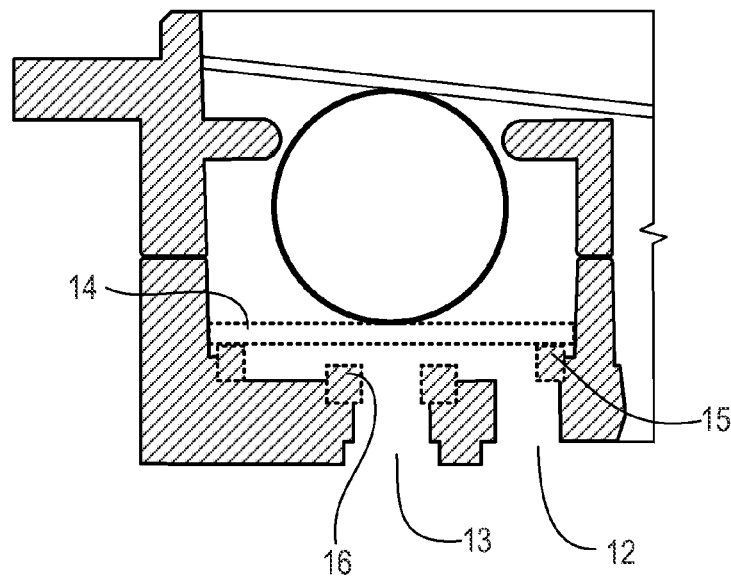
Figure 7C:
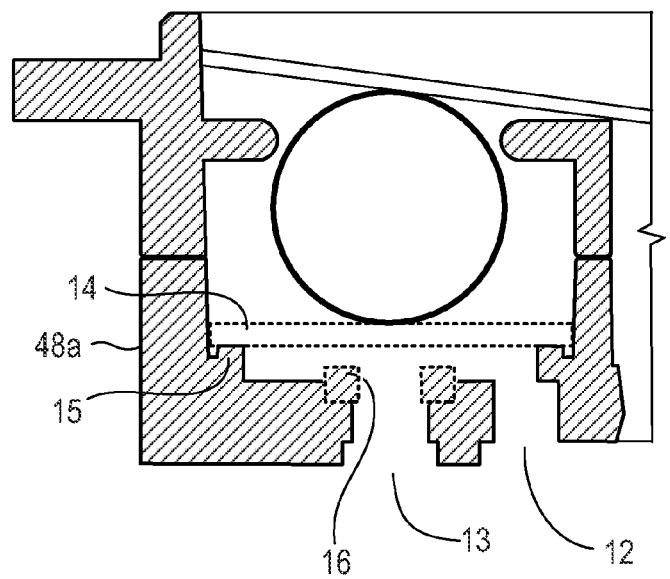
Figure 7D:
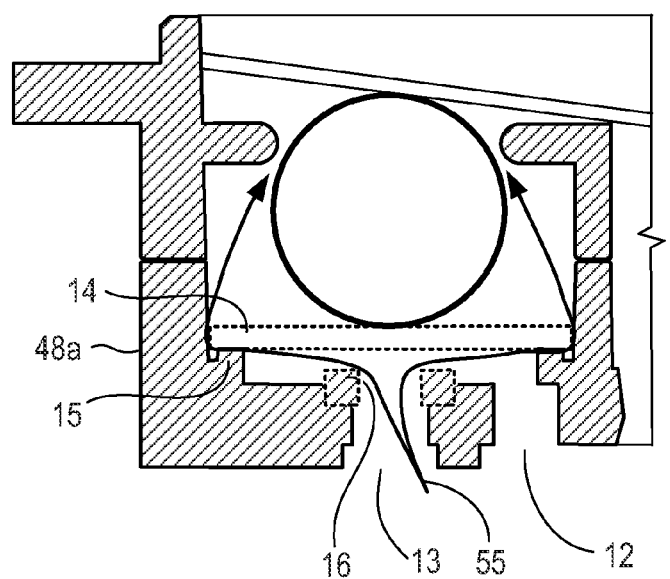

FIGS. 7A-7D are representational views of respective valve functions of the integrated multifunctional valve device of FIGS. 1 and 4 according to examples. In FIGS. 7B-7D, some components of the integrated multifunctional valve device 10 are represented as solid lines and other components are represented as dashed lines for illustrative purposes.

Referring to FIG. 7A, in the present example, the integrated multifunctional valve device 10 includes an integrated regulator valve, a first pressure-actuated valve and a second pressure-actuated valve. In examples, one or more of the regulator valve, first pressure-actuated valve and second pressure-actuated valve may be check valves. In the present example, each of the regulator valve, the first pressure-actuated valve and the second pressure-actuated valve are check valves.

Referring to FIG. 7B, in the present example, the regulator valve includes an actuator member such as the lever member 66b and the actuator ball 66a, the flexible disk member 14, the first seat member 15, the second seat member 16, the first port 12 and the second port 13. The regulator valve has an open state (FIG. 6B) corresponding to the open port position of the flexible disk member 14 and a closed state (FIG. 6C) corresponding to the close port state of the flexible disk member 14. That is, in the open state, the regulator valve establishes fluid communication between the first port 12 and the second port 13. Alternatively, in the closed state, the regulator valve stops the fluid communication between the first port 12 and the second port 13.

Referring to FIG. 7B, in the present example, the integrated multifunctional valve device 10 includes the flexible disk member 14, the first seat member 15, the second seat member and the first port 12 to form a first pressure-actuated valve corresponding to the open state of the regulator valve.

Referring to FIG. 7C, in the present example, the flexible disk member 14, the second seat member 16 and the second port 13 form a second pressure-actuated valve corresponding to the open state of the regulator valve. The first and second pressure-actuated valves may be placed into the closed state by urging the central portion 14a of the flexible disk member 14 against the second seat member 16 thereby covering the second port 13. In the hyperinflation priming and/or purging state, the flexible disk member 14 may be placed into the close port position, even when the lever member 66b and ball 66a do not move the central portion 14a.

Referring to FIG. 7D, in an example, an integrated multifunctional valve device 10 of FIG. 4 includes an integrated regulator valve, a first pressure-actuated valve, and second pressure-actuated valve as previously described and illustrated in FIG. 7A-7C. Additionally, the integrated multifunctional valve device 10 includes a capillary relief valve. In the present example, the flexible disk member 14, the first seat member 15, the first housing member 48a, the second seat member and the second port 12 form a capillary relief valve corresponding to the open state of the regulator valve. In examples, the actuator ball 66a, the second housing member 48b, the first housing member, the flexible disk member 14, the first seat member 15, the second seat member and the second port form a capillary relief valve corresponding to the open state of the regulator valve. The capillary path 55 may be configured to selectively transport air from the second port 13 to a chamber within the fluid container 80 such as a regulated chamber 83 (FIG. 8).

In an example, the capillary path 55 selectively transports air from the second port 12 to the regulated chamber 83 based on a respective state of the regulated chamber 83 such as the backpressure regulation state.

Figure 8:
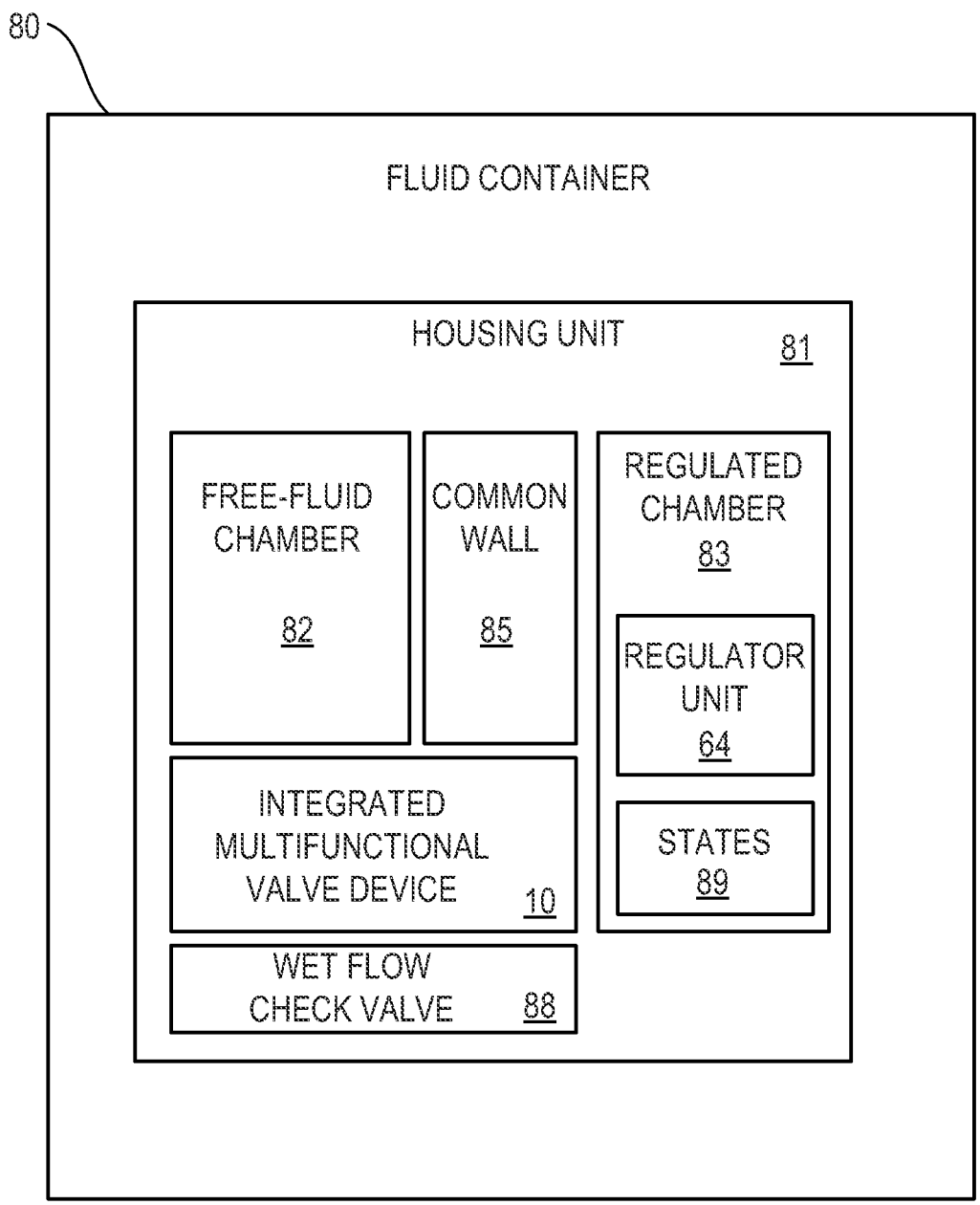
FIG. 8 is a block diagram illustrating a fluid container according to an example.

FIG. 8 is a block diagram illustrating a fluid container according to an example. The fluid container 80 may be usable with an image forming apparatus. Referring to FIG. 8, in the present example, the fluid container 80 includes a housing unit 81 and an integrated multifunctional valve device 10. The housing unit 81 includes a free-fluid chamber 82 and a regulated chamber 83 configured to store fluid. In the present example, the first port 12 is in fluid communication with ambient atmosphere and the second port 13 is in fluid communication with the free-fluid chamber 82. In an example, the first and the second pressure-actuated valve may be a free-fluid valve (FIG. 7C) and a vent valve (FIG. 7B), respectively. The free-fluid valve may be configured to selectively transport air from the vent valve into the free-fluid chamber. The vent valve may be configured to selectively transport air from ambient atmosphere to the free-fluid valve. The fluid container 80 may also include a wet flow check valve 88 selectively in fluid communication with the free-fluid chamber 82 and the regulated chamber 83. For example, the wet flow check valve 88 may be in an open state allowing fluid communication from the free-fluid chamber 82 to the regulated chamber 83 and, in a closed state, restricting fluid communication from the free-fluid chamber 82 to the regulated chamber 83. In an example, the wet flow check valve 88 may include a port, a seat surrounding the port and a check ball movable towards and away from the seat and port.

In an example, the regulated chamber 83 includes a regulator unit 64 such as an expansion and contraction member and a plurality of states 89 such as the hyperinflation priming and/or purging state (FIG. 6A), the backpressure regulation state (FIG. 6B), and the normal and/or altitude robust state (FIG. 6C). The regulator unit 64 is configured to regulate the respective fluid therein. The free-fluid chamber 82 and regulated chamber 83 are separated by a common wall 85. An integrated multifunctional valve device 10 previously described and illustrated in FIGS. 1-7C may be disposed on the common wall 85 of the housing unit 81. In examples, the free-fluid container 80 may include a removable ink cartridge, the free-fluid chamber 82 may be a free-ink chamber, and the image forming apparatus may include an inkjet printer.

The present disclosure has been described using non-limiting detailed descriptions of examples thereof that are provided by way of example and are not intended to limit the scope of the present disclosure. It should be understood that features and/or operations described with respect to one example may be used with other examples and that not all examples of the present disclosure have all of the features and/or operations illustrated in a particular figure or described with respect to one of the examples. Variations of examples described will occur to persons of the art. Furthermore, the terms "comprise," "include," "have" and their conjugates, shall mean, when used in the disclosure and/or claims, "including but not necessarily limited to."

It is noted that some of the above described examples that are illustrative and therefore may include structure, acts or details of structures and acts that may not be essential to the present disclosure and which are described as examples. Structure and acts described herein are replaceable by equivalents, which perform the same function, even if the structure or acts are different, as known in the art. Therefore, the scope of the present disclosure is limited only by the elements and limitations as used in the claims.

What is claimed is:

1. An integrated multifunctional valve device usable with a fluid container, the device comprising:
    a port member having a first port and a second port formed therein;
    a flexible disk member having a central portion and a surrounding portion, the central portion movable between an open port position to establish fluid communication between the respective ports and a close port position to stop the fluid communication between the respective ports;

a first seat member extending in a first direction from a surface of the port member and coupled to the surrounding portion of the flexible disk member;

a second seat member extending in the first direction from the surface of the port member and surrounded by the first seat member, the second seat member recessed relative to the first seat member in a second direction opposite the first direction, the second seat member to selectively receive the central portion of the flexible disk member corresponding to the close port position; and an actuator member to selectively move the central portion of the flexible disk member between the open port position and the close port position, the actuator member comprising:
  an actuator ball; and
  a lever member movable between a plurality of positions, the lever member to move the actuator ball relative to the second seat member based at least on the respective position of the lever member.

2. The device according to claim 1, further comprising:
a first housing member extending in the first direction from the port member, the first housing member surrounding the first port, the second port, the first seat member, the second seat member and the flexible disk member; and
a capillary path formed between the first seat member, the flexible disk member, the first housing member, the second seat member and the second port, the capillary path to selectively transport air from the second port to a regulated chamber.

3. The device according to claim 2, further comprising:
a second housing member coupled to the first housing member to form an enclosed chamber therein, the second housing member having an access opening to provide access inside and outside of the enclosed chamber.

4. The device according to claim 3, wherein the flexible disk member and the actuator ball are movably disposed in the enclosed chamber, and wherein the lever member has an end coupled to the second housing member and is disposed outside of the enclosed chamber and accesses the actuator ball extending through the access opening of the second housing member.

5. The device according to claim 2, wherein:
the lever member, the actuator ball, the flexible disk member, the first seat member, the second seat member, the first port and the second port form a regulator valve having an open state corresponding to the open port position and a close state corresponding to the close port position;
the flexible disk member, the first seat member, the second seat member and the first port form a first pressure-actuated valve corresponding to the open state of the regulator valve;
the flexible disk member, the second seat member and the second port form a second pressure-actuated valve corresponding to the open state of the regulator valve; and
the flexible disk member, the first seat member, the first housing member, the second seat member and the second port form a capillary relief valve corresponding to the open state of the regulator valve.

6. The device according to claim 1, wherein the first and second seat members comprise concentric rings, the first seat member comprising an outer ring extending in the first direction from the surface of the port member and the second seat member comprising an inner ring extending less than the first seat member in the first direction from the surface of the port member.

7. The device according to claim 1, wherein the flexible disk member is to move into the close port position based on at least one of the respective position of the lever member and a state of an inflatable bag of the fluid container including a backpressure regulation state, a hyperinflation priming and/or purging state, and a normal and/or altitude robust state.

8. The device according to claim 1, wherein the lever member is placed in the respective plurality of positions based at least on an expansion state of a regulator unit of the fluid container.

9. A fluid container usable with an image forming apparatus, the fluid container comprising:
a housing unit including a free-fluid chamber and a regulated chamber to store fluid and separated by a common wall, the regulated chamber including a regulator unit to regulate the respective fluid therein; and
an integrated multifunctional valve device disposed on the common wall of the housing unit, the device comprising:
  a port member having a first port and a second port formed therein;
  a flexible disk member having a central portion and a surrounding portion, the central portion movable between an open port position to establish fluid communication between the respective ports and a close port position to stop the fluid communication between the respective ports;
  a first seat member extending in a first direction from a surface of the port member and coupled to the surrounding portion of the flexible disk member;
  a second seat member extending in the first direction from the surface of the port member and surrounded by the first seat member, the second seat member extending to a lesser extent from the surface of the port member relative to the first seat member, the second seat member to selectively receive the central portion of the flexible disk member corresponding to the close port position; and
  an actuator member to selectively move the central portion of the flexible disk member between the open port position and the close port position, the actuator member comprising:
an actuator ball; and
a lever member movable between a plurality of positions, the lever member to move the actuator ball relative to the second seat member based at least on the respective position of the lever member.

10. The device according to claim 9, wherein the first and second seat members comprise concentric rings, the first seat member comprising an outer ring extending in the first direction from the surface of the port member and the second seat member comprising an inner ring extending in the first direction to the lesser extent from the surface of the port member.

11. The device according to claim 9, further comprising:
a first housing member extending in the first direction from the port member, the first housing member surrounding the first port, the second port, the first seat member, the second seat member and the flexible disk member;
a second housing member coupled to the first housing member to form an enclosed chamber therein, the second housing member having an access opening to provide access inside and outside of the enclosed chamber; and
a capillary path formed between the first seat member, the flexible disk member, the first housing member, the second seat member and the second port, the capillary path to selectively transport air from the second port to the regulated chamber; and wherein the flexible disk member and the actuator ball are movably disposed in the enclosed chamber, and wherein the lever member has an end coupled to the second housing member and is disposed outside of the enclosed chamber and is to access the actuator ball extending through the access opening of the second housing member.

12. The device according to claim 11, wherein:

the lever member, the actuator member, the flexible disk member, the first seat member, the second seat member, the first port and the second port form a regulator valve having an open state corresponding to the open port position and a closed state corresponding to the close port position;

the flexible disk member, the first seat member, the second seat member and the first port form a first pressure-actuated valve corresponding to the open state of the regulator valve;

the flexible disk member, the second seat member and the second port form a second pressure-actuated valve corresponding to the open state of the regulator valve; and the flexible disk member, the first seat member, the first housing member, the second seat member and the second port form a capillary relief valve corresponding to the open state of the regulator valve.

13. The device according to claim 9, wherein the fluid container comprises a replaceable ink cartridge and the image forming apparatus comprises an inkjet printer.

14. An integrated multifunctional valve device usable with a fluid container, the device comprising:

a port member having a first port and a second port formed therein;

a flexible disk member having a central portion and a surrounding portion, the central portion movable between an open port position to establish fluid communication between the respective ports and a close port position to stop the fluid communication between the respective ports;

a first seat member extending in a first direction from a surface of the port member a first distance, the first seat member to support the surrounding portion of the flexible disk member;

a second seat member extending in the first direction from the surface of the port member a second distance less than the first distance and surrounded by the first seat member, the second seat member to selectively receive the central portion of the flexible disk member corresponding to the close port position; and an actuator member to selectively move the central portion of the flexible disk member between the open port position and the close port position.

15. The device according to claim 14, wherein the actuator member comprises:

an actuator ball; and a lever member movable between a plurality of positions, the lever member to move the actuator ball relative to the second seat member based at least on the respective position of the lever member.

16. The device according to claim 15, further comprising:

a first housing member extending in the first direction from the port member, the first housing member surrounding the first port, the second port, the first seat member, the second seat member and the flexible disk member; and a capillary path formed between the first seat member, the flexible disk member, the first housing member, the second seat member and the second port, the capillary path to selectively transport air from the second port to a regulated chamber.

17. The device according to claim 16, further comprising:

a second housing member coupled to the first housing member to form an enclosed chamber therein, the second housing member having an access opening to provide access inside and outside of the enclosed chamber.

18. The device according to claim 17, wherein the flexible disk member and the actuator ball are movably disposed in the enclosed chamber, and wherein the lever member has an end coupled to the second housing member and is disposed outside of the enclosed chamber and accesses the actuator ball extending through the access opening of the second housing member.

19. The device according to claim 15, wherein the flexible disk member is to move into the close port position based on at least one of the respective position of the lever member and a state of an inflatable bag of the fluid container including a backpressure regulation state, a hyperinflation priming and/or purging state, and a normal and/or altitude robust state.

20. The device according to claim 14, wherein the first and second seat members comprise concentric rings, the first seat member comprising an outer ring extending in the first direction from the surface of the port member the first distance and the second seat member comprising an inner ring extending in the first direction from the surface of the port member the second distance.

* * * * *